United States Patent [19]
Terai et al.

[11] Patent Number: 5,152,957
[45] Date of Patent: Oct. 6, 1992

[54] FOREIGN MATTER RECOVERING APPARATUS FOR FUEL ASSEMBLY FOR NUCLEAR POWER GENERATION

[75] Inventors: Fujio Terai; Masaaki Furuya, both of Yokohama; Masaru Ukai, Kawasaki, all of Japan

[73] Assignee: Kabushiki Kaisha Toshiba, Kawasaki, Japan

[21] Appl. No.: 664,851

[22] Filed: Mar. 5, 1991

[30] Foreign Application Priority Data

| Mar. 5, 1990 | [JP] | Japan | 2-51680 |
| Nov. 5, 1990 | [JP] | Japan | 2-299649 |
| Feb. 21, 1991 | [JP] | Japan | 3-27433 |

[51] Int. Cl.⁵ ............................ G21C 19/00
[52] U.S. Cl. ............... 376/248; 376/245; 376/310
[58] Field of Search ........ 376/248, 310, 245, 258, 376/260, 261

[56] References Cited

U.S. PATENT DOCUMENTS

| 4,036,686 | 7/1977 | Weilbacher et al. | 376/248 |
| 4,464,332 | 8/1984 | Boisseuil et al. | 376/248 |
| 4,673,545 | 6/1987 | Cooke et al. | 376/248 |
| 4,683,109 | 7/1987 | Cooper, Jr. et al. | 376/310 |
| 4,764,334 | 8/1988 | King et al. | 376/248 |

FOREIGN PATENT DOCUMENTS

| 0053066 | 6/1982 | European Pat. Off. |
| 0085616 | 8/1983 | European Pat. Off. |
| 0192406 | 8/1986 | European Pat. Off. |
| 3404574 | 8/1985 | Fed. Rep. of Germany. |
| 2298859 | 8/1976 | France. |
| 2633769 | 1/1990 | France. |
| 60-93996 | 5/1985 | Japan. |
| 63-259508 | 10/1988 | Japan. |

Primary Examiner—Daniel D. Wasil
Attorney, Agent, or Firm—Oblon, Spivak, McClelland, Maier & Neustadt

[57] ABSTRACT

A foreign matter recovering apparatus includes a body for approaching a fuel assembly, a body fixing section for fixing the body to the fuel assembly for positioning, a moving mechanism section movable relative to the body, a recovering working unit adapted to be moved by the moving mechanism section to gain access to clearance of the fuel assembly to allow foreign matter to be recovered thereby, and a remote control section for remotely controlling the working unit on the basis of an image representing a working state of the working unit to operate it properly.

16 Claims, 15 Drawing Sheets

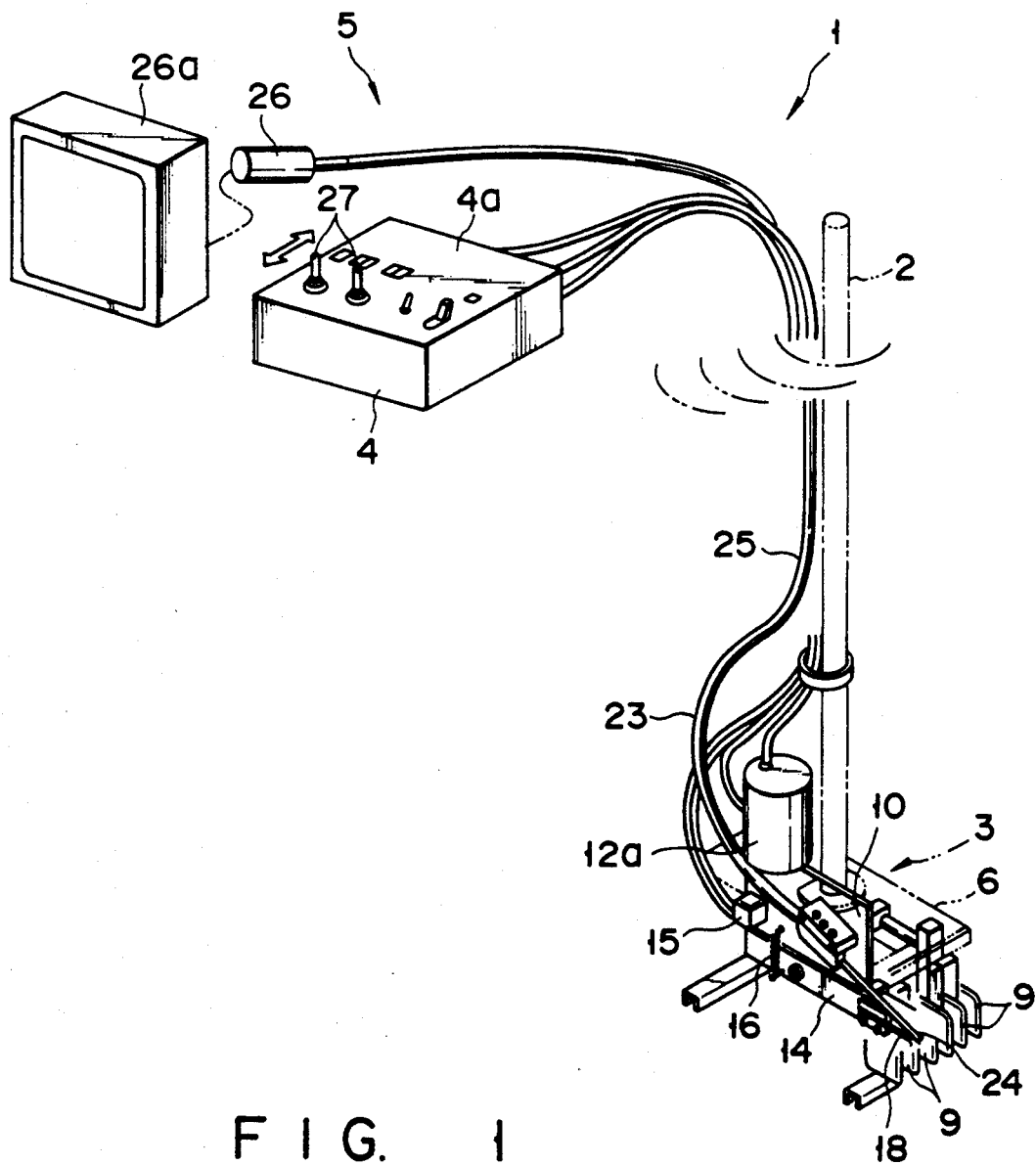
F I G. 1

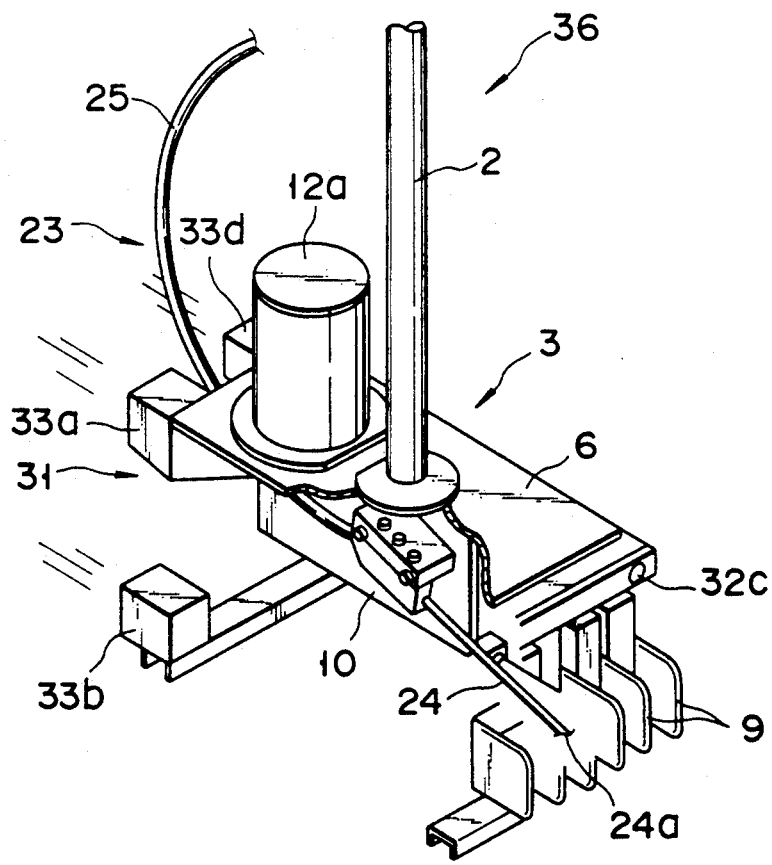
F I G. 5
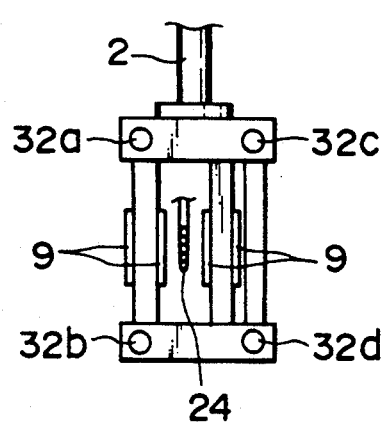
F I G. 6
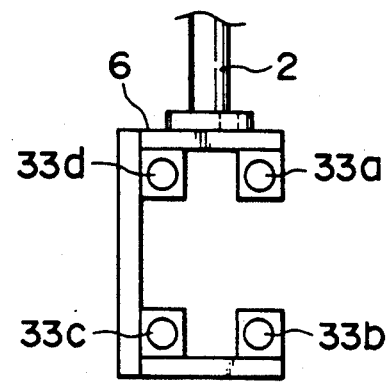
F I G. 7

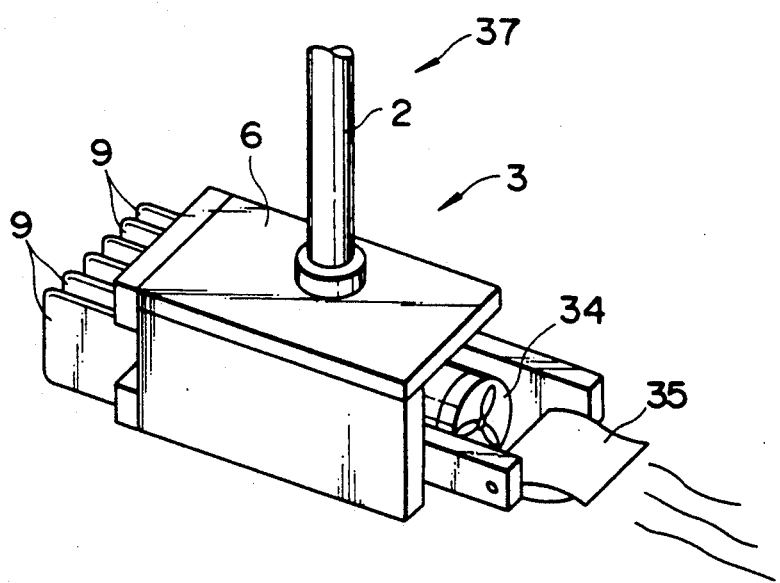
F I G. 8

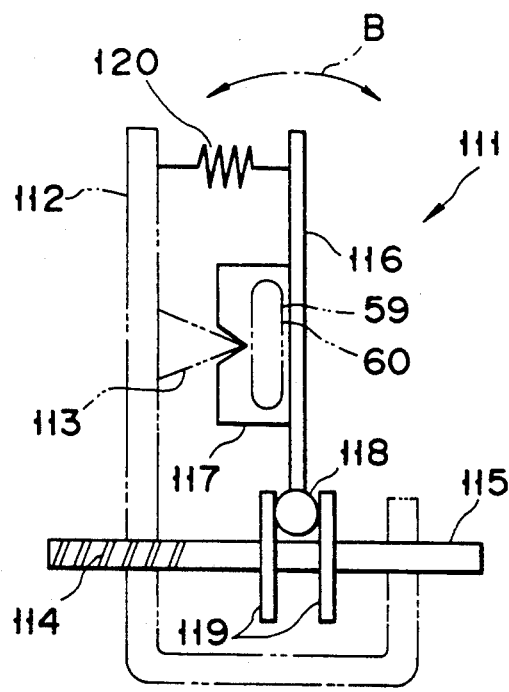
F I G. 16
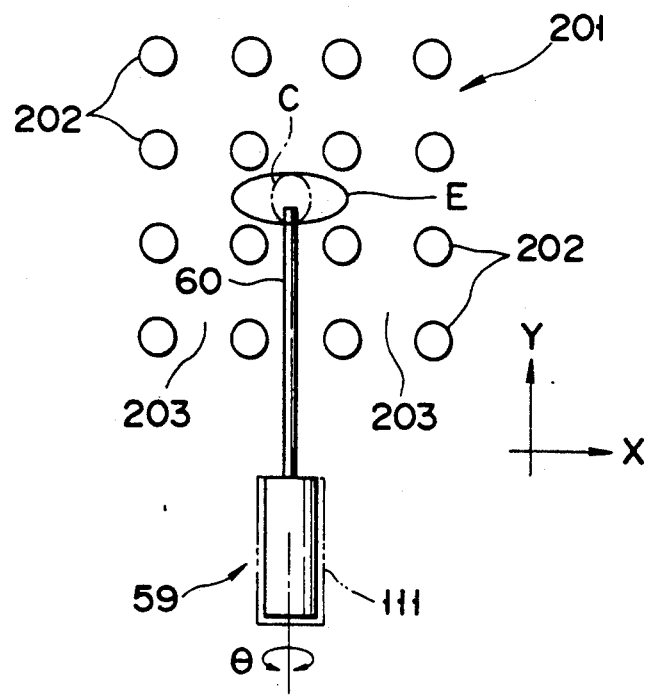
F I G. 17

FOREIGN MATTER RECOVERING APPARATUS FOR FUEL ASSEMBLY FOR NUCLEAR POWER GENERATION

BACKGROUND OF THE INVENTION

1. Field of the Invention

The present invention relates to a foreign matter recovering apparatus for recovering a small foreign matter present in a space inaccessible by an operator and, in particular, a space of fuel assembly for nuclear power generation.

2. Description of the Related Art

It has been generally known to use, for example, a magic hand and forceps as a means for recovering foreign matter trapped in a narrow space. Further, it has also been known to use, as means for recovering a foreign matter trapped in a normally inaccessible or hard-to-access space, a medical endoscope for immediately eliminating foreign matter by a biopsy forceps as well as a vacuum for vacuum-sucking foreign matter by a nozzle from a distant location.

The endoscope is guided into the human body cavity to photograph the interior of the internal organs of a human being or remotely controlled from outside the human body to remove its diseased region by the forceps so that a diagnostic treatment is made from within the human body.

In nuclear power generation, use is made of a fuel assembly 201 as shown in FIG. 19. The fuel assembly 201 is comprised of pipe-like fuel elements 202, ... filled with nuclear fuel and has a full length of, for example, about 4 m with clearances 203, ... of, for example, 2 to 3 mm created among the respective fuel elements 202, .... FIG. 19 shows the fuel assembly comprised of 8×8 fuel elements.

In FIG. 19, reference numerals 204 and 205 show upper and lower tying plates, respectively. The fuel elements 202, ... are held, by the upper and lower tying plates 204 and 205, at their upper and lower end portions.

In FIG. 19, reference numeral 206 shows a plurality of spacers (only one of them is shown) disposed in a longitudinal direction of the fuel elements 202 such that they are held partway in the longitudinal direction of the fuel elements 202, .... The spacer 206 includes a mechanism for individually holding the fuel elements 202, ....

External springs 207, ... are disposed between the upper ends of the fuel pairs 202 and the upper tying plate 204.

The fuel assembly 201 is held, prior to use, for example, in a fuel storage pool 208 as shown in FIG. 20, and suspended at a water depth of about 10 m.

Further, the fuel assembly 201 may be temporarily held in the storage pool 208 in the event of a nuclear reactor failure, etc., so that it is inspected for its defect. Therefore, the fuel assembly can be held in the pool not only before its use but also at any necessary time during its use.

In the case where foreign matter, such as screws and metal pieces, is trapped in the fuel assembly 201 in the pool 208, it is necessary to recover it, but the fuel assembly 201 is suspended in the storage pool at the water depth of 10 m under a high pressure environment where there exits radiation of high intensity. The clearances 203 among the fuel elements 202 are each created on the order of as small as 2 to 3 mm.

It is, therefore, not possible to immediately recover such foreign matter by hand. It is required that the means for recovering the foreign matter be remotely controlled at a position adequately spaced apart from the fuel assembly 201.

It may be considered that the aforementioned endoscope is applied to the recovery of the foreign matter in the fuel assembly 201. The medical endoscope can be directly operated, while viewing the foreign matter through an eyepiece, in which case the instrument is remotely controlled at an operation distance of, for example, about 1 m. The control of the instrument direction, driving of the forceps, etc., are done with the use of an operation force transmitted through a flexible wire. Further, the endoscope is usually so set to have 5 mm in external diameter.

It is, therefore, difficult for the endoscope to recover a small foreign matter at a position adequately remote from the fuel assembly 201, that is, to guide the instrument's tip into the fuel assembly 201 and set it there, guide the instrument's tip or forceps into the clearance 203 of the fuel elements 202, and accurately drive the forceps and recover the foreign matter.

For a means for vacuum-sucking a foreign matter without a visual inspection, it is difficult to accurately locate its vacuum nozzle at a predetermined position of an object of interest.

SUMMARY OF THE INVENTION

It is accordingly the object of the present invention to provide a foreign matter recovering apparatus which can positively recover a small foreign matter present in an environment not accessible by hand, while being visually identified.

According to the present invention, there is provided a foreign matter recovering apparatus comprising: a body for approaching a fuel assembly; a body fixing section for fixing the body to the fuel assembly for positioning; a moving mechanism section movable relative to the body; a recovering working unit adapted to be moved by the moving mechanism section to gain access to very small clearances of the fuel assembly to allow any foreign matter to be recovered thereby; and a remote control section for remotely controlling the working unit on the basis of an image representing a working state of the working unit to operate it properly.

BRIEF DESCRIPTION OF THE DRAWINGS

FIG. 1 is a perspective view showing a portion of a foreign matter recovering apparatus according to a first embodiment of the present invention;

FIG. 5 is a perspective view, partly taken away, showing a working unit in a second embodiment of the present invention;

FIG. 6 is a view diagrammatically showing the working unit at its front side;

FIG. 7 is a view diagrammatically showing the working unit at its back side;

FIG. 8 is a perspective view diagrammatically showing a third embodiment of the present invention;

FIG. 16 is a view showing a fiberscope oscillation mechanism in a seventh embodiment of the present invention;

FIG. 17 is a view showing a visual field of a fiberscope in the preceding embodiment;

DETAILED DESCRIPTION OF THE PREFERRED EMBODIMENTS

Figure 2:
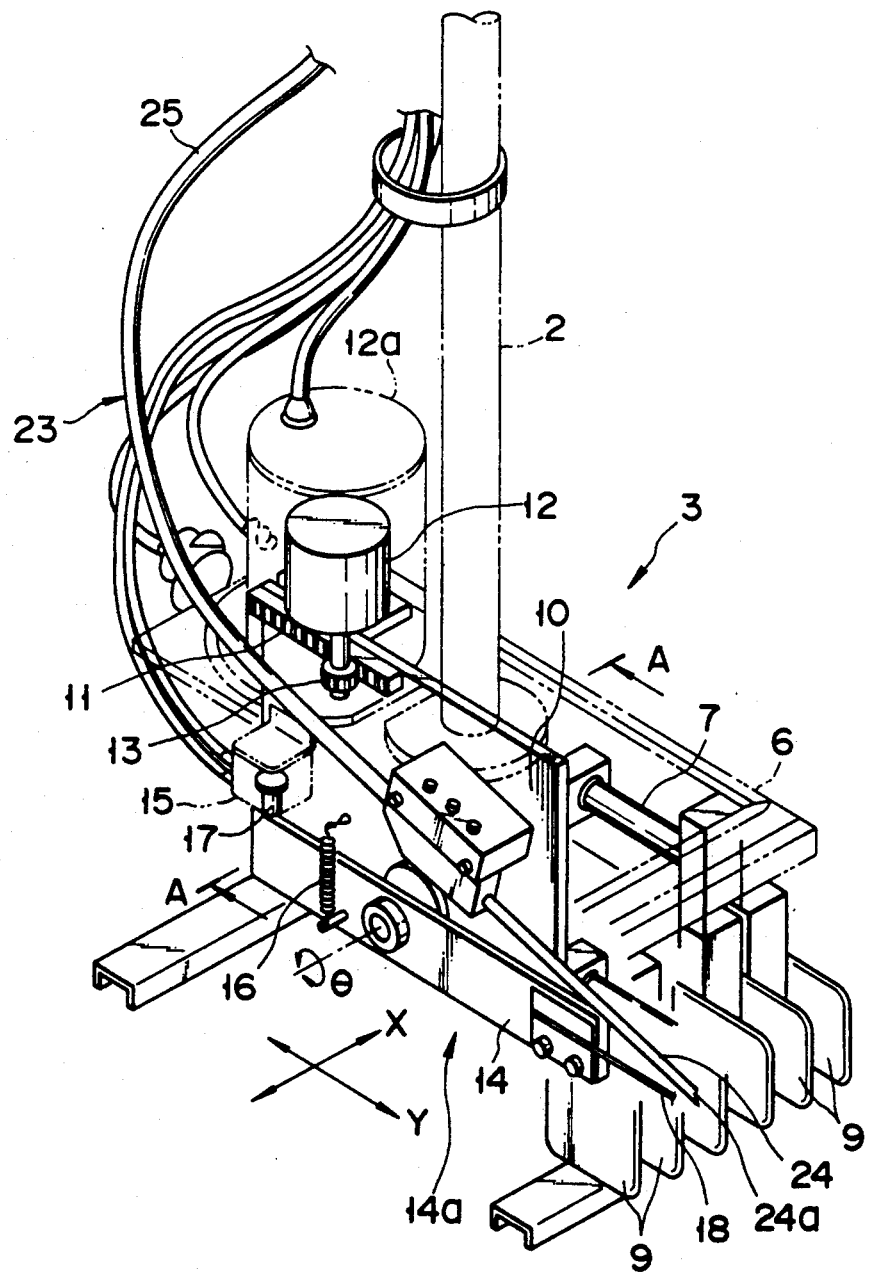
FIG. 2 is a perspective view showing a portion of a working unit in the first embodiment.

The embodiments of the present invention will be explained below with reference to the drawings.

In FIG. 1, reference numeral 1 shows a foreign matter recovering apparatus (hereinafter referred to as a recovering apparatus) which, in a nuclear power generation equipment or plant, recovers screws, metal pieces etc., trapped or caught in a fuel assembly, as well as foreign matter, such as fur and dust, deposited on the fuel elements in the fuel assembly.

The recovering apparatus 1 comprises a working unit (body) 3 fixed to the lower end of a pipe-like support pole 2 of a circular cross-section extending in a straight way and sunken in the body of the water, and a remote control section 5 having a controller 4 arranged over the water at a predetermined location. The controller 4 is located outside, for example, a fuel storage pool and adapted to control the working unit 3.

The working unit 3 is sunken in the body of the water through the operation of the support pole 2 and brought down to a water depth of, for example, about 10 m where it is moved closer to the fuel assembly (not shown). As shown in FIG. 2, the working unit 3 has a rectangular table 6 as indicated by a dash dot line and guide shafts 7 and 8, upper and lower, mounted below the fixed table 6 and extending in a parallel array.

In the working unit 3, a plurality of guide fins 9, are provided, as a body fixing section, in front of the working unit 3 and arranged, for example, at a predetermined interval, in a parallel array in a direction of the width of the working unit 3, that is, in a direction of an arrow X in FIG. 2.

The guide fins 9, . . . extend from the working unit 3 and are inserted in the parallel array into clearances created among respective parallel bar-like fuel elements in the fuel assembly. With the front edges of the fixed table placed in contact with the fuel assembly, the guide fins 9, . . . prevent any position error or displacement of the working unit 3 in the X-direction and fix the working unit 3 in place relative to the fuel assembly.

Here it may be considered that those portions in contact with the fuel elements, such as front edges and guide fins 9, . . . , of the fixed table 6 are made of, for example, a radiation-resistant resin.

A movable table 10 is mounted on the working unit 3 and serves as a movable mechanism section comprised of a rectangular plate. The movable table 10 depends from the lower side of the fixed table 6 with its longitudinal section oriented in a front/back direction. The movable table 10 is provided midway across the width of the fixed table 6.

The movable table 10 is slidably movable in the front/back direction of the working unit 3, that is, in a Y-direction in FIG. 2.

Figure 3:
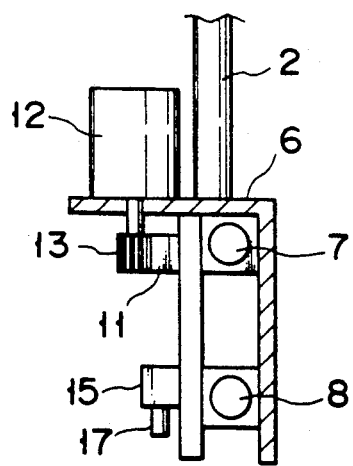
FIG. 3 is a cross-sectional view, taken along A—A in FIG. 2, showing a portion of the working unit.

Stated another way, the movable table 10 has a rack 11 mounted integral with its one surface as shown in FIGS. 2 and 3 and extending along its longitudinal direction. A pinion 13 of a motor 12 which is fixed on the upper side of the fixed table 6 and has its rotation shaft extending down on the lower surface side of the fixed table 6 is engaged with the rack 11 on the movable table 10.

A rotational force of the motor 12 is transmitted to the movable table 10 by the rack and pinion 13 to enable the movable table 10 to be moved back and forth in the Y direction while being guided by the guide shafts 7 and 8. The movable table 10 can be stopped in any desired position during its movement in the Y direction.

The motor 12 is covered by a motor casing 12a in an airtight fashion to prevent the penetration of water As the motor 12, used is made of, for example, a servo motor whereby it is possible to properly control an amount of displacement.

A swingable plate 1 is coupled to the movable table 10 in a manner to face the lower edge portion of the movable table 10, the intermediate portion of the swingable plate 14 being swingably supported on the table 10. The swingable plate 14 has its upper end face facing a submergible air cylinder 15 located on the rear portion of the movable table 10 and fixed there.

A coil spring 16 is anchored at one end to the movable table 10 and at the other end to the rear end portion of the swingable plate 14. The swingable plate 14 has its rear end portion depressed down by a piston 17 extending from the cylinder 15 and is swung in a direction of an arrow θ in FIG. 2, while extending and deforming the coil spring 16, to tilt its forward end upward. With the piston 17 retracted back and swingable plate 14 released from the depression force of the submergible air cylinder 15, the swingable plate 14 is returned back, for example, to tilt its forward end downward under the urging face of the coil spring 16.

A recovery probe (hereinafter referred to as a probe) 18 is located at the forward end portion of the swingable plate 14 and serves as a recovering working area. The probe 18 has, for example, a needle-like tip and is, for example, below 2 mm in external diameter. The probe 18 has its base portion fixed to the forward end portion of the swingable plate 14. The probe 18 extends along the longitudinal direction of the swingable plate 14 and extends from the forward end portion of the swingable plate 14 with its tip oriented in a predetermined state relative to the swingable plate 14.

The probe 18, together with the swingable plate 14, is moved as one unit and has its tip moved up and down by a predetermined amount in accordance with the extending and retraction of the piston 17.

The probe 18, together with the movable table 10, is moved, as one unit, through the swingable plate 14 to allow the probe tip to be penetrated into clearances among the fuel elements. The probe 18, together with the movable table 10, is moved as one unit to orient it in the Y direction. Further, the probe 18, together with the movable plate 14, is swung as one unit to allow its direction to be oriented in the θ direction.

It may be considered that, in cooperation with the motor 12 and cylinder 15, the probe 18 is driven to scrape off fur, dust, etc., deposited on the fuel elements so that they are recovered from there.

A probe swinging mechanism 14a comprises the swingable plate 14, air cylinder 15, coil spring 16, etc., and serves as a recovering working section swinging mechanism.

Figure 4:
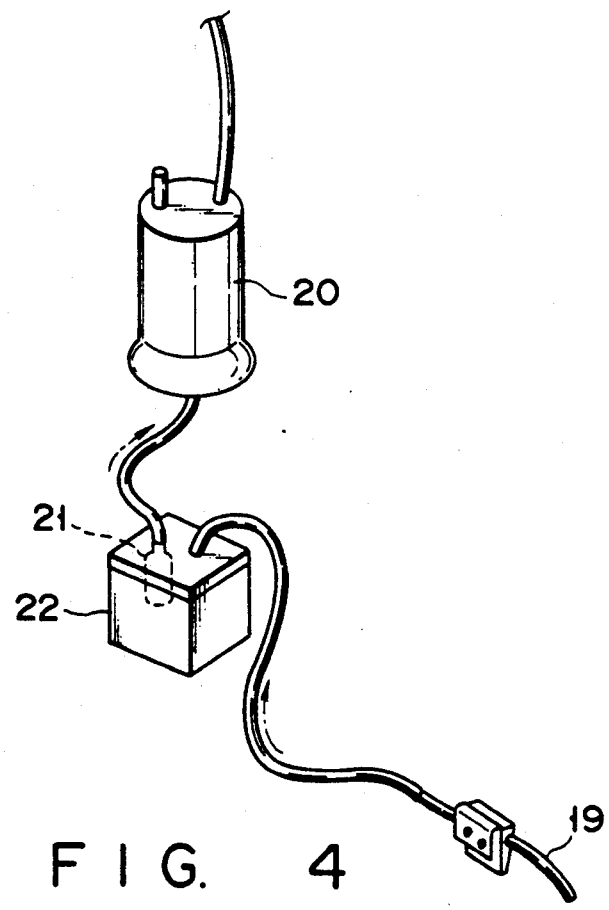
FIG. 4 is a view showing a vacuum probe applicable to the embodiment of the present invention.

It may be considered that, as the probe 18, use is made of, for example, a vacuum probe for vacuum-sucking a foreign matter and a magnetic probe for attracting a foreign matter. For the case of the vacuum probe, a suction nozzle 19 is employed as the probe as shown in FIG. 4. It may be considered that a submergible pump 20, which is placed in the water for a nuclear reactor, sucks foreign matter through the suction nozzle 19 and recovers it by a recovery case 22 provided between the suction nozzle 19 and the submergible pump 20 and equipped with a filter 21.

In FIG. 2, reference numeral 23 shows a fiberscope. The fiberscope 23 has a distal end portion with, for example, an array of imaging and illumination tubes of, for example, below 2 mm in diameter. The distal end portion 24 is fixed to the movable table 10. The fiberscope 23 is moved into proximity to the tip of the probe 18 with the distal end 24a oriented toward the probe's tip so that the tip of the probe 18 is covered within a viewing field of the fiberscope 23.

The fiberscope 23 is so tilted as to have an optical end face of the imaging and illumination tubes, etc., oriented toward the axis of the fiberscope. The viewing field of the imaging fiber is illuminated. An image is taken by an optical element, such as a prism, etc., and transmitted to a CCD (charge coupled device) provided on the side of, for example, a remote control section.

The fiberscope 23 has its distal end portion 24 moved, together with the movable table 10, as one unit in a manner to follow the motion of the probe 18. In this way, it is possible to photograph the tip of the probe 18, while the distal end portion of the fiberscope is thus moved.

The fiberscope 23 enables the manner of sucking or magnetically attracting, for example, a metal piece or scraping off fur, dust, etc., deposited on the fuel elements to be viewed through an eyepiece 26 connected to the distal end portion 24 via a flexible cable 25 extending between the body of the water and the surface of the water and through a monitor 26a connected to the eyepiece 26 as shown in FIG. 1.

Here, the image of the fiberscope 23 may be displayed directly on the monitor 26a.

The remote control section 5 comprises a controller 4, eyepiece 26 disposed near the controller 4, and monitor 26a. The remote control section 5 is of such a type that joysticks 27, 27, etc., are provided on an operation panel 4a of the controller 4 connected to the working unit 3 through a plurality of flexible cables 28 . . . . The remote control section 5, for example, enables the motor 12 and cylinder 15 to be driven independently by operation of the controller 4 while viewing an image displayed on the monitor 26a.

The recovering apparatus 1 is operated as will be set forth below.

First, the support pole 2 is operated to allow the working unit 3 to be submerged in the body of the water. The guide fins 9, . . . are penetrated into the clearances among the fuel elements at a water depth of, for example, about 10 m where the working unit 3 is located relatively to the fuel assembly and fixed there. The controller 4 is operated at a location over the water surface distant from the fuel assembly, causing the motor 12 to be driven and hence the probe 18 and fiberscope 23 to be penetrated into the clearances among the fuel elements.

The foreign matter and probe's tip are covered by the fiberscope 23 as one image and the controller 4 is operated while viewing that image on the eyepiece 26. For example, the motor 12 and submergible air cylinder 15 are properly and simultaneously driven, enabling the probe 18 to be properly located for the foreign matter to be recovered.

In the recovering apparatus 1, the working unit 3 with the probe 18 and fiberscope 23 attached thereto is brought into proximity to the fuel assembly. The working state of the working unit 3 is photographed by the fiberscope 23 and the probe's tip is penetrated into small clearances among the fuel elements and recovers foreign matter there. For this reason, any small foreign matter present in a specific environment inaccessible by a worker or by hand can be recovered at the distant location while being visually examined.

Since the motor 12 positioning the probe 18 and fiberscope 23, as well as the submergible air cylinder 15 etc., is mounted on the working unit 3, it is possible to efficiently, positively and very accurately accomplish the positioning of the probe 18 and fiberscope 23.

Since the positioning of the probe 18 and fiberscope 23 in the Y direction is effected by the motor 12 and the positioning of the probe 18 in the θ direction is effected by the air cylinder 15, the probe 18 is positioned only in one direction by the controlled operation of the motor and can readily be moved closer to foreign matter.

The probe 18 and fiberscope 23 can be moved toward a spot in the fuel assembly.

In the case where, as the probe 18, use is made of a vacuum probe or magnetic probe, since the probe needs not be placed in contact with the foreign matter, any foreign matter can be positively recovered even if positioning of the probe is setting only in the Y direction.

It is possible to employ an ultrasonic probe as the probe 18.

As the probe 18 is positioned only in one direction by the controlled operation of the motor, only one motor is required, making the working unit 3 compact and light in weight. It is possible to simplify the arrangement of the controller 4.

After the guide fins 9, . . . are retracted back from the fuel assembly, the working unit 3 can be moved in the X direction.

In order to identify the presence of fur, etc., it may be possible to utilize the difference between it and the rest of the fuel element through the utilization of the state in which light is reflected on the surface of the fuel element. The contrast in light between them cannot exactly identify any fur on the fuel element, but the presence and position of any fur can be exactly identified by bringing the probe into contact with the fur or scraping it off the surface of the fuel element.

Further it is possible for diagnostically making contact the fuel element and to thus to exactly known the state of the fuel assembly.

It is also possible to jet a stream of water by the probe, or direct air bubbles by the probe, at the surface of the fuel elements so that any foreign matter can be eliminated or recovered.

The foreign matter, once being eliminated, may again be deposited on the surface of the fuel element, but, if any means is provided for eliminating it from the surface of the fuel element, it can be recovered by that means to prevent redeposition of the foreign matter on the fuel element.

The fiberscope image, depending upon the image resolution of the CCD, etc., can be displayed as a high accurate image on the remote control section because the fiberscope 23 and probe 18 are brought into close proximity to the foreign matter on the fuel element.

The motor 12 is of such a type as to allow any proper displacement control operation and it is possible to accurately drive, displace and position the probe 18 and fiberscope 23.

The recovering apparatus 1 can check and examine the fuel assembly.

The working unit 3 can be positioned in a gravity direction by suspending it by means of a winch, etc.

Although, in the aforementioned embodiment, a combination of the rack 11 and pinion 13 is utilized in the transmission of power to the movable table 10, the present invention is not restricted to it. For example, a trapezoidal screw thread can be utilized instead.

The swingable plate 14 can be driven by utilizing a motor, in which case it is possible to impart an enhanced operability to the swingable plate 14.

Incorporating the working unit 3 into a remotely controlled submergible craft eliminates the need to provide the support pole 2, etc.

FIGS. 5 to 7 show a major area of a recovering apparatus according to a second embodiment of the present invention. The same reference numerals are employed to designate parts or elements corresponding to those described in conjunction with the preceding embodiment. Further explanation of them is, therefore, omitted for the sake of brevity.

In the arrangement shown in FIG. 5, reference numeral 2 shows a support pole whose upper end portion is exposed over the surface of the water and 3, a working unit submerged beneath the surface of the water and fixed to the lower end of the support pole 2. The working unit 3 is fixed in place relative to the fuel assembly by guide fins 9, . . . provided at the front of the working unit and located in a lateral direction, that is, in a direction of X in FIG. 5.

The working unit 3 includes a probe as a recovering working section, not shown, and fiberscope 23 for normally covering the distal end of the probe within a visual field. A TV camera and monitor are connected to the proximal end, not shown, of the fiberscope 23. The working unit 3 slidably moves a movable table 10 back and forth by a motor held in a motor casing 1a to allow the probe and distal end 24 of the fiberscope 23 to be penetrated into the clearances among the fuel elements in a fuel assembly.

The working unit 3 is of such a type that the probe and fiberscope's distal end are controlled by operating a controller while being viewed on the monitor, not shown, to allow the recovery of foreign matter present in the clearances among, or on the surfaces, of the fuel elements.

An attitude control means 31 is provided on the working unit 3 and comprised of four contact sensors 32a to 32d provided in front of the working unit 3 and four water stream generation sections 33a to 33d provided in back of the working unit 3 to jet water streams backward. The attitude control means 31 is of such a type that the contact sensors 32a to 32d and water stream generation sections 33a to 33d are provided ahead and behind it, respectively, at four corners for example.

Upon the contact of the working unit's front end with the fuel assembly during the fixing of the working unit 3 to the fuel assembly, the attitude control means 31 can detect the tilt of the working unit 3 relative to the fuel assembly on the basis of the ON and OFF states of the contact sensors, that is, the relative position of those contact sensors turned ON upon contact with the fuel assembly and those contact sensors turned OFF upon separation with the fuel assembly.

In order to bring those contact sensors spaced from the fuel assembly, into contact with the fuel assembly the attitude control means 31 selects the water stream generation sections corresponding to the OFF contact sensors so that they are driven toward the fuel assembly. The attitude control means 31 jets a water stream backward, varying the tilt of the working unit through the utilization of a thrust force originating from some of the water stream generation sections 33a to 33d or a difference in propulsion force between the water stream generation sections 33a to 33d. It is thus possible to control the attitude of the working unit 3.

Stated in another way, in the recovering apparatus 36 including the attitude control means 31 the tilt of the working unit 3 relative to the fuel assembly is corrected by the attitude control means, automatically controlling the attitude of the working unit 3. For this reason, the working unit 3 accommodates its gravity variation and hence can be made lighter in weight. It is also possible to prevent the fuel elements from being injured by the working unit 3.

It may be considered that, upon the movement of the movable table, etc., the gravity of the working unit 3 is shifted, that is, the working unit 3 is displaced into a tilted position to make the positioning of the working unit 3 relative to the fuel assembly difficult. In order to position the working unit 3 relative to the fuel assembly through the controlling of the working unit's tilt, an extensive study needs to be made on the connection position between the support pole 2 and the working unit so as to meet a shifting gravity of the working unit 3. It is also necessary, during an initial phase of positioning, to add an additional weight to the working unit 3 so that a balance can be obtained.

In the case where the working unit 3 is tilted, it is difficult to uniformly push the working unit 3 against the fuel assembly by drawing the support pole 2 toward the operator. By a strong push, the fuel assembly is liable to be injured.

The working unit 3 is liable to be tilted by a buoyant force of the motor casing 12a.

The attitude control means 31, provided on the working unit 3, accommodates a shift of gravity automatically and prevents a tilt, thus maintaining the attitude of the working unit 3 constant.

It is not necessary to add a weight to the working unit 3 during an initial phase of positioning, so that the working unit 2 can be made lighter in weight.

The working unit 3 can be uniformly pressed with a given pressure against the fuel assembly by turning on all the contact sensors 32a to 32d, for example, and making the thrust forces as set out above equal and constant. The working unit 3 can be prevented from being pressed with an excessive and nonuniform pressure and being injured.

It may be possible to use touch sensors, pressure sensors, etc., as contact sensors for the attitude sensor.

FIG. 8 shows a major area of a third embodiment of the present invention. The same reference numerals are employed to designate parts or elements corresponding to those set out in connection with the previous embodiment. Further explanation of them is omitted for the sake of brevity.

Although, in the second embodiment, a plurality of water stream generation sections are provided as a water jet type, one screw propeller 34 is provided as a water stream generation section in the recovering apparatus 37 according to the third embodiment of the present invention. The attitude of the working unit 3 is controlled by the crew propeller 34 and rudder 35.

In FIG. 8, the working unit 3 has the screw propeller 34 at a substantially middle of the rear side and the rudder 35 located behind the screw propeller 34 and swingable up and down. The working unit 3 has its front area pushed against the fuel assembly by the thrust force of the screw propeller 34 and has its up and down tilt controlled by the rudder 35 whose direction varies based on an output signal of the touch sensor.

The working unit 3 has its X-direction attitude held substantially constant by the guide fins 9, . . . and has its attitude controlled by the rudder 35 in one direction, that is, in a direction of Z.

Figure 9:
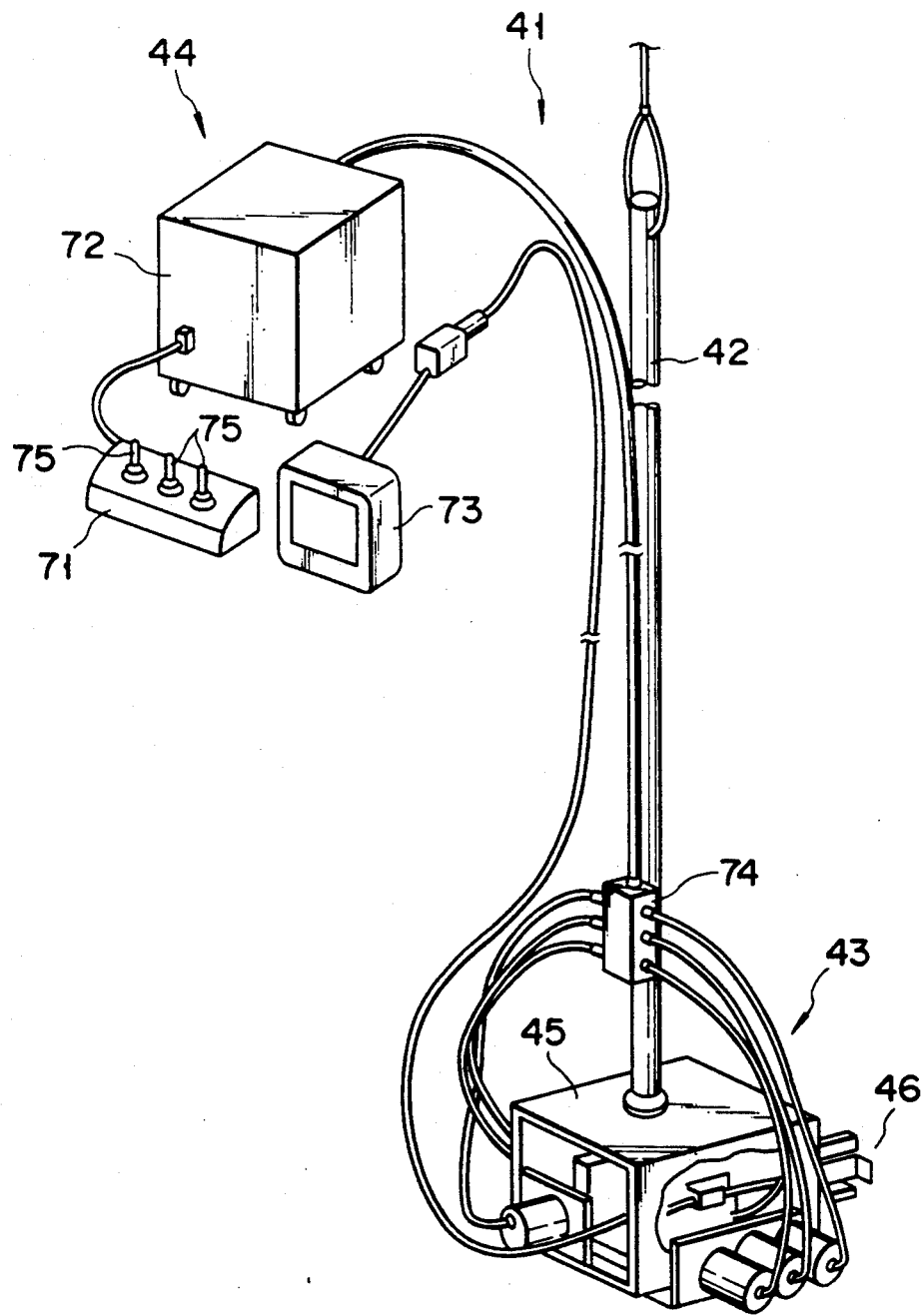
FIG. 9 is a view, partly broken away, showing a fourth embodiment of the present invention.
Figure 10:
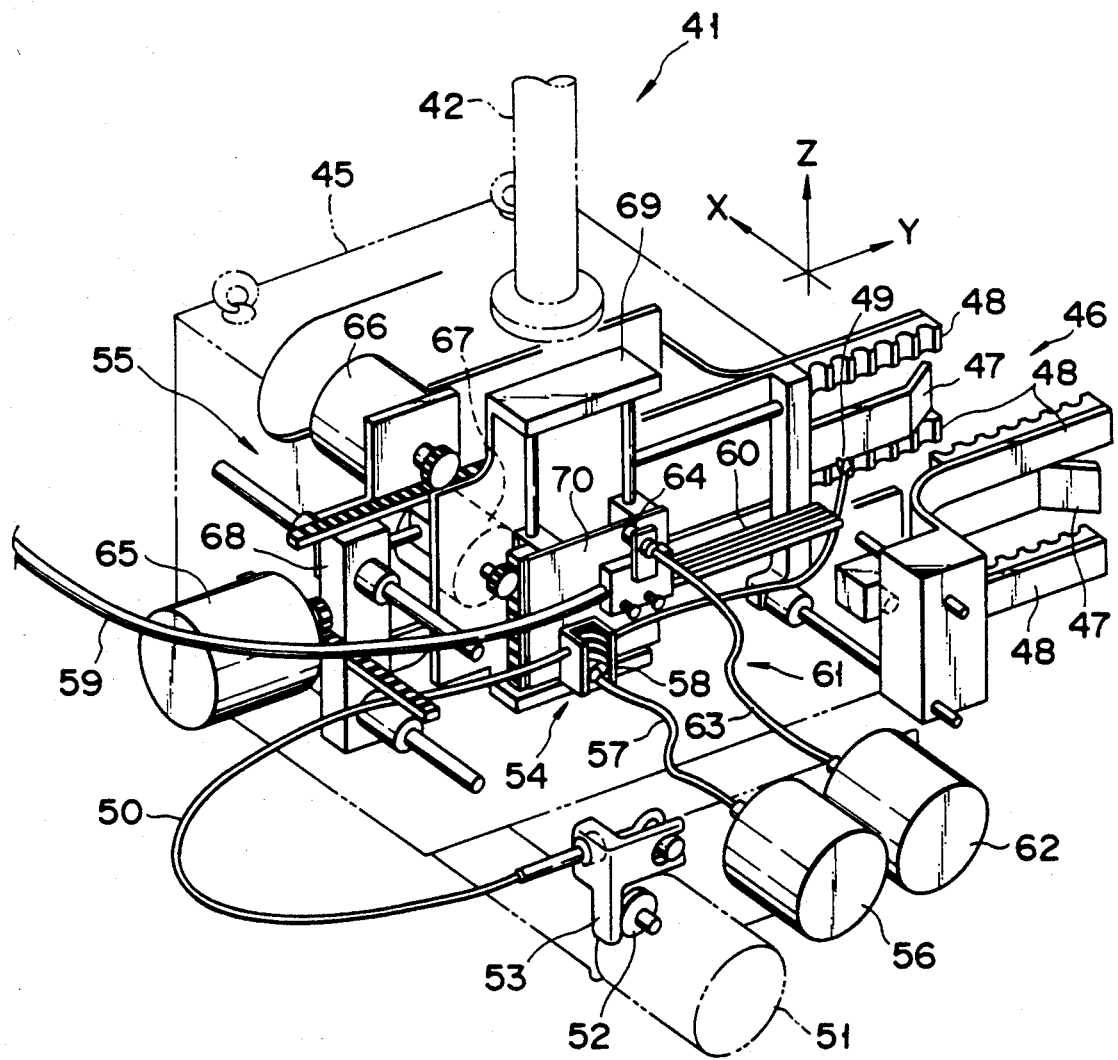
FIG. 10 is a perspective view showing a portion of a working unit in the fourth embodiment.

FIGS. 9 and 10 show a fourth embodiment of the present invention. The same reference numerals are employed in this embodiment to designate parts or elements corresponding to those shown in the respective previous embodiments. Further explanation of them i omitted for simplicity.

In FIG. 9, reference numeral 41 shows a foreign matter recovering apparatus (hereinafter referred to a recovering apparatus) for a nuclear power generation plant or equipment, which can recover, for example, screws or metal pieces trapped in the fuel assembly as well as any fur, dust, etc., deposited on the fuel elements in the fuel assembly.

The recovering apparatus 41 comprises a working unit 43 submerged beneath the surface of the water and fixed to a support pole 42 extending in a straight fashion and a remote control section 44 located on the water at a given position and outside, for example, a nuclear reactor.

The working unit 43 is sunken beneath the surface of the water through the operation of the support pole 42 and brought down to the water depth of, about 10 m where it is moved closer to a fuel assembly, not shown. As shown in FIG. 10, the working unit 43 has a rectangular casing 45 as indicated by a dash-dot line and equipped with a body fixing section 46 (hereinafter referred to simply as a fixing section) projecting from the casing 45.

The fixing section 46 includes plate-like guides 47, 47 passing near a fuel assembly in a manner to be interposed therebetween and four clamps 48, . . . provided outside the guides 47, 47 and having parallel arrays of grooves inside the clamps to correspond to the location of the fuel elements. The fixing section 46, being so interposed, clamps the fuel assembly by the clamps 48, . . . with the fuel elements of the fuel assembly fitted in their grooves so that the casing 45 is held in place relative to the fuel assembly.

The working unit 43 includes forceps 49 as a recovering operation section. The forceps 49 is mounted on the distal end of a flexible wire 50 comprised of inner and outer wires and extending out from the interior of the casing 45 and is placed, for example, near the base ends of the clamps 48, . . . . The forceps 49 is opened and closed by, for example, the inner wire of the flexible wire 50 connected at its base end to a link 53 engaged with a cam 52 which is rotated by a forceps drive motor 51.

The forceps 49 has its flexible wire 50 connected partway to a forceps rotation mechanism section, as shown by 54 in FIG. 10, and to a positioning mechanism section 55 as will be described later. The forceps 49 is rotated by a rotational force transmitted by a forceps rotation motor 56 in the forceps rotation mechanism section 54 through a flexible shaft 57, helical-type gear portion 58, etc.

In FIG. 10, reference numeral 59 shows a fiberscope whose distal end provides a linear array of imaging and illumination areas, etc. The fiberscope 59 has its distal end 60 moved nearer and faced to the forceps 49 so that it covers the forceps 49 within its viewing field. The distal end 60 of the fiberscope 59 is fixed to the positioning mechanism section 55.

The fiberscope 59 has an optical end face of the imaging and illumination areas oriented obliquely relative to its axis and the field of vision is illuminated by the illumination area. An image is taken through an optical element means, such as a prism, and transmitted to a CCD (charge coupled device) provided, for example, on the remote control section side.

The fiberscope 59 has its distal end coupled to a fiberscope rotation mechanism section as shown by 61. The fiberscope 59 has its distal end 60 rotated around a direction of Y in FIG. 10, that is, in the right/left direction with its base end as a center. This can be done by transmitting a rotational force of a forceps rotation motor 62 which is arranged in juxtaposition with the forceps rotation motor 51 to the distal end of the fiberscope through a flexible shaft 63, gear 64, etc.

The positioning mechanism section 55 has first to third feed motors 65, 66 and 67 and first to third movable bodies 68, 69 and 70 linearly movable by the drive forces of the feed motors 65, 66 and 67 through their rack-and-pinion mechanisms. The positioning mechanism section 55 has the flexible wire 50 of the forceps, as well as the distal end of the fiberscope 59, coupled to the third movable body 70 formed of a platelike element.

The positioning mechanism 55 is of such a type that the movable bodies 68 to 70 and the two feed motors 66 and 67 are moved by the first feed motor 65 in the right-/left direction, that is, in the X direction in FIG. 10, that the second and third movable bodies 69 and 70 and third feed motor 67 are moved by the second motor 66 in a front/back direction of the casing 45, that is, in the Y direction in FIG. 10, and that the third movable body 70 is moved by the third feed motor 67 in an up/down direction of the casing 45, that is, in the Z direction in FIG. 10.

By selectively driving the first to third feed motors 65 to 67, he positioning mechanism section 55 allows the distal end portions of the forceps and fiberscope 59 which are provided integral with the third movable body 70 to be moved to any proper position among the fuel elements, while moving the distal end 50 in a manner to follow the forceps 49. By so doing, the forceps 49 is positioned, while normally covering the forceps within a visual field of the fiberscope 59.

In this embodiment, as the first to third feed motors 65 to 67 and forceps rotation motors 51 and 62, use is made of those motors which can properly control a displacement, such as a servo motor.

The remote control section 44 comprises, as shown in FIG. 9, an operation panel 71, controller (control section) 72 monitor (display section) 73 and connects a controller 72 to an operation panel 71 and a monitor 73 to the fiberscope 59. Further, the remote control section 44 connects the controller 72 to a connector box 74 for gathering conductive wires of the respective motors of the working unit 43 beneath the surface of the water.

The remote control section 44 enables a image which is picked up by the fiberscope 59 to be sent to the monitor 73 where it is possible to display the state in which the forceps 49 penetrates the clearances among the fuel elements and recovers foreign matter trapped there.

In the remote control section 44, a plurality of joysticks 75, . . . are mounted upright on the operation panel 71 and some of them are operated by an operation while viewing an image on the monitor 73, during which time an instruction signal is sent by the remote control section from the operation panel 71 to the controller 72. The remote control section 44 controls the respective associated motors, individually, in the submerged working unit by means of the controller 72 to allow the forceps 49 and fiberscope 59 to be positioned relative to each other, driven, etc.

Stated another way, the recovering apparatus 41 is so operated that the forceps 49 and fiberscope 59 in the working unit 43 are moved into proximity to the fuel assembly and then into clearances among the fuel elements, while viewing the state of working there, to achieve recovery of a foreign matter. By so doing, it is possible to recover foreign matter, while visually locating it at a remote site, in a specific environment not inaccessible by an operator or operator's hand.

In the working unit 43, the fixing section 46 is clamped to the fuel assembly, coarsely locating the working unit 43 relative to the fuel assembly and then finely locating the forceps 49 and fiberscope 5 under the operation of the positioning mechanism section 55. It is thus possible to position the forceps 49 and fiberscope 59 with high accuracy.

In the movement of the forceps 49 from one clearance to another, the first to third feed motors 65 to 67 are respectively driven with the casing 45 fixed, so that necessary associated parts, that is, the forceps 49 and fiberscope 59 alone can be moved into a site of interest in the fuel assembly. It is, therefore, possible to readily move the forceps 49 from one clearance to another in the fuel assembly.

It is possible to very exactly locate the forceps 49 and fiberscope 59 in any proper site of interest and limited part in the fuel assembly.

The foreign matter thus located ca be exactly eliminated using the forceps 49 provided in the working unit. The re-deposition of the once-eliminated foreign matter can be prevented by providing a means for sucking or magnetically attracting it for recovery.

Further, it is also possible to diagnostically contact with the fuel assembly for the presence of any foreign matter and to more exactly know the state of the fuel assembly.

The foreign matter can be caught directly by the forceps and recovered positively to a proper position, for example, and it is possible to remove the foreign matter trapped or caught, for example, at the spacer of the fuel assembly 201 or o scrape off a fur deposited on the fuel element by means of the forceps 49.

Further, for the motors 51, 56 and 62 as well as the motors 65, 66 and 67 use is made of those motors for enabling any proper displacement control, so that forceps 49 and fiberscope 59 can exactly be driven, displaced and positioned In this embodiment, although the fixing section 46 is mounted integral with the working unit 43, the working unit 43 may be displaced relative to the fixing section 46 instead and self-propelled along the fuel assembly with the fuel assembly held in place by the fixing unit 46.

The motors, etc., of the working unit 43 can be properly eliminated in a selective way in accordance with the freedom with which the forceps 49 needs to be moved.

Further, the working unit 43, being built into a remotely controlled submergible craft, eliminates the need for providing, for example, a support pole 42.

Figure 11:
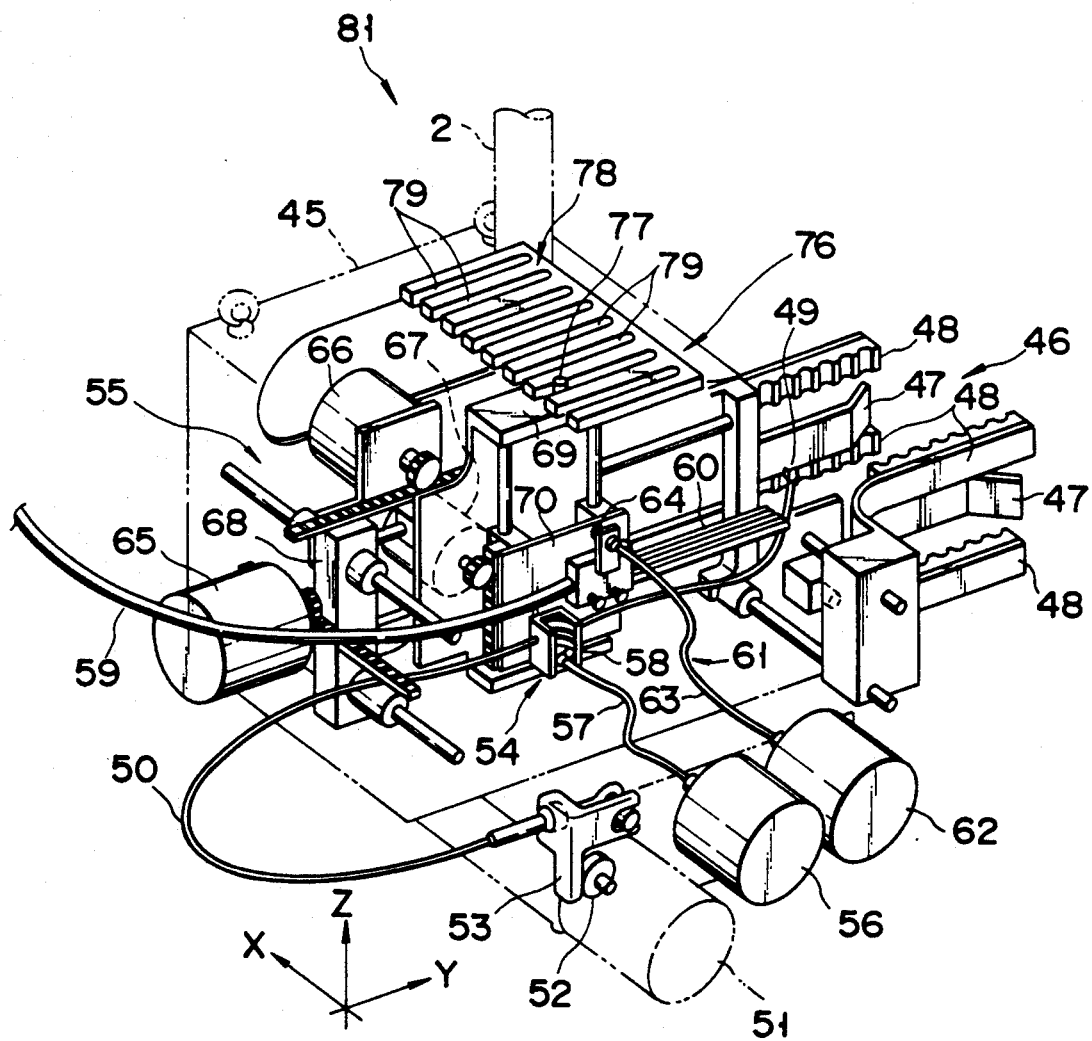
FIG. 11 is a perspective view showing a portion of a working unit in a fifth embodiment of the present invention.
Figure 12:
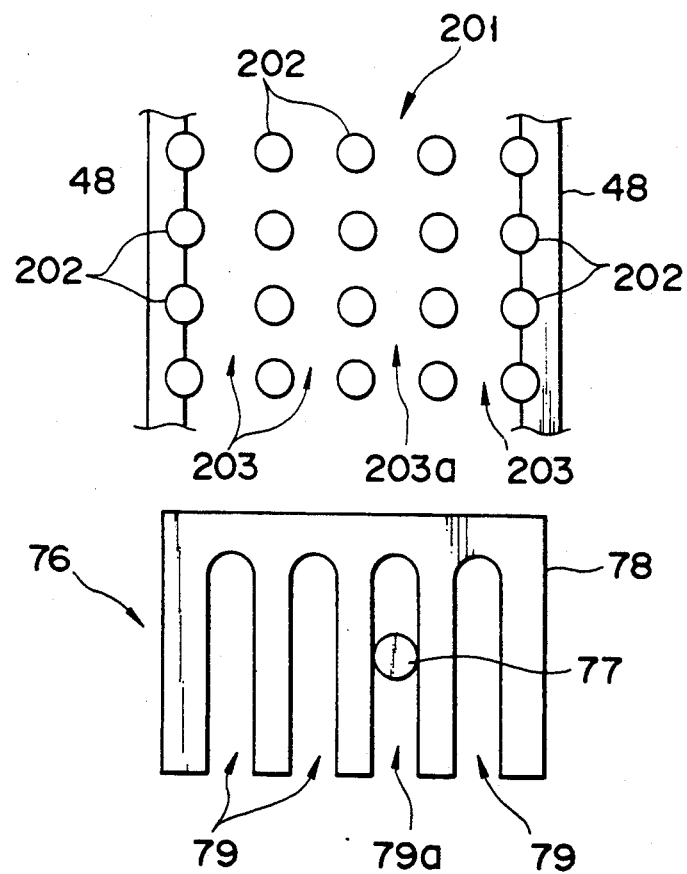
FIG. 12 is a view showing the function of an interlocking mechanism section in FIG. 11.

FIGS. 11 and 12 show a major section of a recovering apparatus according to a fifth embodiment of the present invention. The same reference numerals are employed in FIGS. 11 and 12 to designate parts or elements corresponding to those shown in the preceding embodiment of the present invention. Any further explanation of them is, therefore, omitted.

In FIG. 11, reference numeral 81 shows a foreign matter recovering apparatus (hereinafter referred to as recovering apparatus) for eliminating a foreign matter deposited or trapped in a fuel assembly for nuclear power generation and for recovering it. This apparatus includes, as referring FIG. 9, a working unit 43 fixed to the lower end of an upwardly extending straight support rod 42 and submerged as a body underneath the surface of the water and a remote control section 44 placed on the surface of the water at a predetermined position such that it is located outside a nuclear reaction.

The working unit 43 includes a positioning mechanism section 55 as shown in FIG. 11.

The positioning mechanism section 55 includes firs to third feed motors 65, 66 and 67 and first to third movable bodies 68, 69 and 70 adapted to be linear moved through their rack-to-pinion mechanisms upon receipt of the rotational forces of the three feed motors 65, 66 and 67. The positioning mechanism section 55 is of such a type that a flexible wire 50 of a forceps 49, as well as the distal end 60 of a fiberscope 59, is coupled to the third movable body 70 made up of a plate-like member.

The positioning mechanism section 55 is arranged such that the third movable body 70 is coupled to the second movable body 69 and that the second and third movable bodies 69 and 70 are coupled to the first movable body 68.

In the positioning mechanism section 55, the movable bodies 68 to 70 and feed motors 66 and 67 are moved by the first feed motor 65, as one unit, in a right/left direction of the casing 45, that is, in the X-direction in FIG.

11; the second and third movable bodies 69 and 70 and third feed motor 67 are moved in a front/back direction of the casing 45, that is, in the Y direction in FIG. 11; and the third movable body 70 is moved by the third feed motor 67 in an up/down direction of the casing 45, that is, in the Z direction in FIG. 11.

The positioning mechanism section 49 is so constructed that a forceps 49 and fiberscope 59 are moved by the first feed motor 65 in the X direction and by the second feed motor 66 in the Y direction and that the forceps 49 and fiberscope 59 are moved by the third feed motor 67 in the Z direction in FIG. 11

In the positioning mechanism section 55, the rotation of the feed motors in a positive direction results in the movement of the forceps 49 and fiberscope 59 in the X-Y-Z (positive) directions and the rotation of the feed motors 65 to 67 in a reverse direction results in the movement of the forceps 49 and fiberscope 59 in the X-Y-Z (negative) positions.

The selective rotation of the first to third feed motors 65 to 67 in the positioning mechanism section 55 allows the forceps 49 and distal end 60 of the fiberscope 59 to be moved to any proper site of interest among fuel elements in accordance with the forceps 49. The forceps 49 is positioned, while normally covering it within a visual field of the fiberscope 59.

An interlocking mechanism section 76 is provided as a movement restriction section at the working unit 43. The interlocking mechanism section 76 comprises a guide pin 77 projected as an engaging projection from the second movable body 69 and a guide plate 78 provided as a comb-like guide member on the second movable body 69.

The guide pin 77 is cylindrical in configuration and provided integral with the upper surface of the second movable unit 69. The guide pin 77, together with the second movable body 69, is moved, as one unit, in the X and Y directions, following the movement of the forceps 49 and fiberscope 59.

The guide plate 78 is made up of a plate-like member. The guide plate is opened at one side and has a plurality of slits 79, . . . as a multi-U shaped array with each U-shaped slit closed at the other side. The guide plate 78 is so constructed that the slits 79, . . . are arranged at substantially the same pitch as those of the fuel elements in the fuel assembly.

The guide plate 78 is fixed, for example, at a predetermined position to the inside of the casing 45 such that it is located close to the second movable body 69. The guide plate 78 has its slit array extending in the X direction and the longitudinal slit portions extending in the Y direction. The guide plate has its closed side oriented toward a fixing section 46 side.

The guide plate 78 is provided with the fixing section 46 as a reference. As shown schematically in FIG. 12, when clamps 48, . . . of the fixing section 46 hold a fuel assembly 201 therebetween to set the casing 45 fixed, the guide plate 78 is so set that its slits 79, . . . are arranged in the Y direction in a manner to correspond to small clearances (for example, 2 to 3 mm) 203, . . . among fuel elements 202, . . . arranged at substantially the same pitch.

When the forceps 49 is displaced in the Y direction from a proper front-facing position relative to one (203a) of the clearances 203, the interlocking mechanism section 76 has its guide pin 77 guided into a slit 79a corresponding to the clearance 203a, that is, it moves the guide pin 77 along the slit 79a to allow the forceps 49 to be moved in a positive Y direction.

The interlocking mechanism section 76 restricts a range of the movement of the forceps 49 in the clearance 203a to one corresponding to the size of the slit 79a.

When the forceps 49 is moved in the positive Y direction from an improper position displaced relative to the clearance 203a, the interlocking mechanism section allows the guide pin 77 to contact with a slit-to-slit area and stops the second movable body 69 to prevent the forceps 49 from being moved in the positive Y direction.

The guide plate has a rigidity great enough to latchingly engage the guide pin 77 there.

The fuel elements 202, . . . are schematically shown in FIG. 12.

The recovering apparatus 81, being equipped with the interlocking mechanism section 76, can readily position the forceps 49 relative to the clearances 203, . . . , among the fuel elements 202, . . . , preventing the forceps 49 from moving toward the fuel assembly 201, while being displaced relative to the clearances 203, . . . , among the fuel elements, and moving into contact with the fuel elements 202, . . . . It is, thus, possible to exactly insert the forceps 49 into the fuel assembly 201 at all times.

Further, even after the forceps 49 has been inserted into the clearance as set out above, the range over which the forceps 49 can be moved can be restricted, preventing the forceps 49 from contacting with the fuel elements 202, . . . .

It is also possible to seek for the clearances 203, among the fuel elements 202, . . . and to position the forceps 49 relative to the clearance without using the fiberscope 59.

Further, the fiberscope 59 can be prevented from being bent or injured upon abutting against the fuel elements 202, . . . , thus keeping the fuels 202, . . . from damage.

In the case where the fiberscope 59 is employed on the recovering apparatus, operators have to rely upon their senses in positioning it in a proper location, offering a risk of introducing an operation error. In order to prevent such an operation error, a greater field of view can be secured to readily seek for any proper position against the fuel assembly. In the present embodiment, the aforementioned interlocking mechanism section 76 prevents an operation error by the operation and can set the visual field of the fiberscope 59 to a minimum possible extent required.

Figure 13:
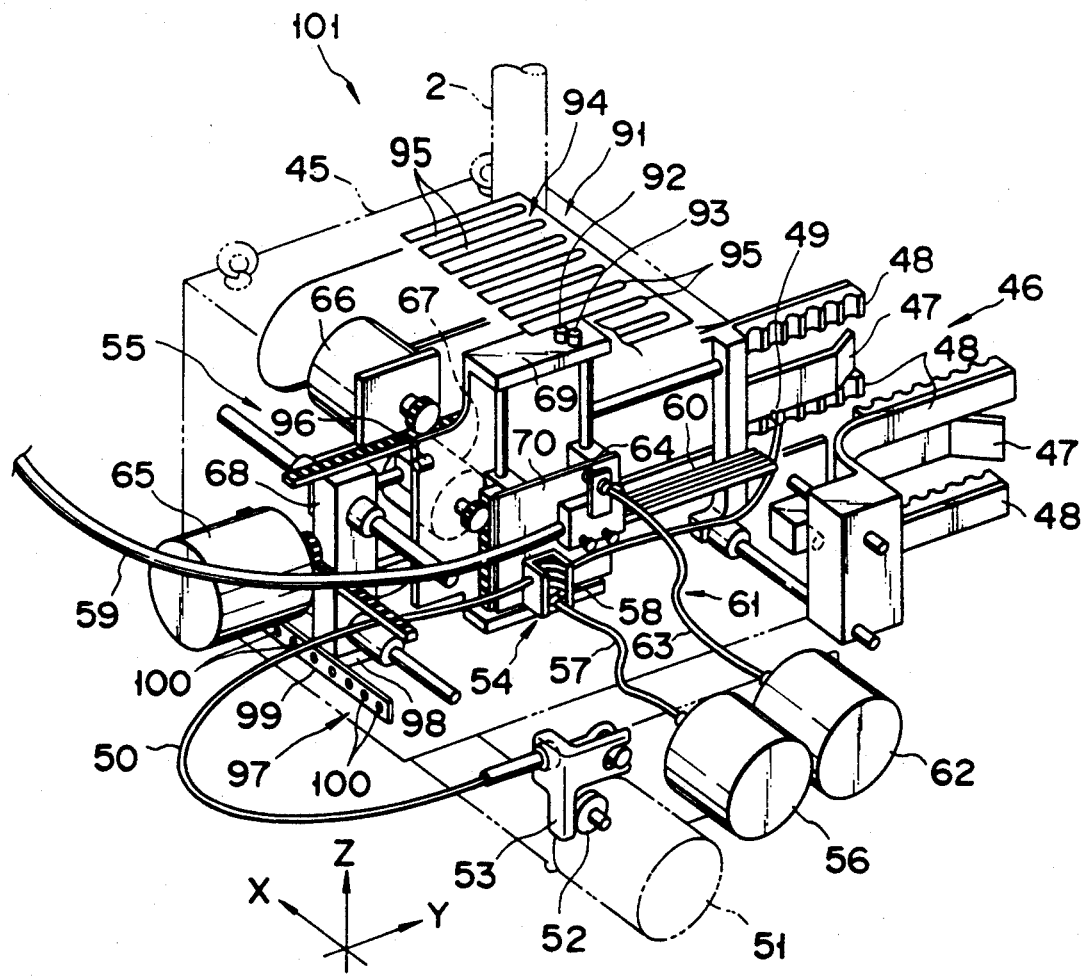
FIG. 13 is a perspective view showing a portion of a working unit in a sixth embodiment of the present invention.
Figure 14:
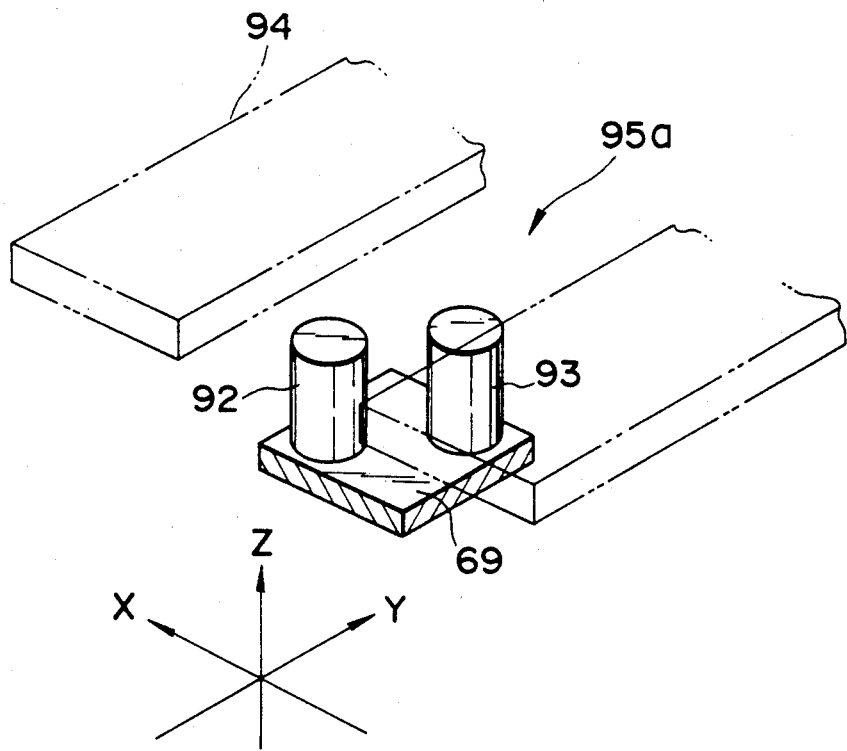
FIG. 14 is a view showing proximity sensors and their surrounding in the preceding embodiment.
Figure 15:
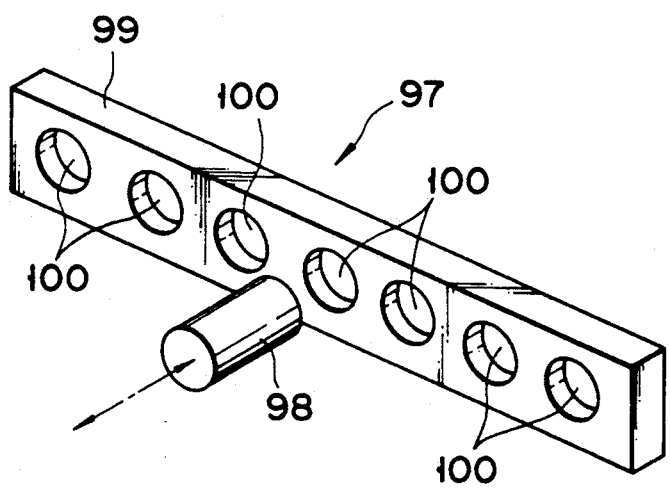
FIG. 15 is a view diagrammatically showing a position detection section in the preceding embodiment.

FIGS. 13 to 15 show a major area of a recovering apparatus according to a sixth embodiment of the present invention. In these Figures, the same reference numerals are employed to designate parts or elements corresponding to those shown in the preceding embodiment. Any further explanation of them is, therefore, omitted.

In FIG. 13, reference numeral 91 shows an interlocking mechanism section serving as a movement restricting section. The interlocking mechanism 91 performs an interlocking operation of the forceps 49 in an X-Y direction and comprises first and second proximity sensors 92 and 93 projected from a second movable body 69 and a comb-like guide plate 94 located over the second movable body 69 and serving as a guide member.

The guide plate 94 has a plurality of slits 95, . . . arranged at an equal pitch. The shape, mount position, direction, etc., of the guide plate 94 are set in substantially the same way as those of, for example, the fifth embodiment of the present invention.

The proximity sensors 92 and 93 are integrally provided on the upper surface of the second movable body 69 and, together with the second movable body 69, are displaced as one unit in the X and Y directions so as to follow the movements of the forceps 49 and fiberscope 59.

The proximity sensors 92 and 93 are turned ON when a distance from an object to be detected becomes below a predetermined value and turned OFF when above the predetermined value. The output signals of the proximity sensors 92 and 93 are sent to the controller (see FIG. 9) serving as a control section of the remote control section 44.

The proximity sensors 92 and 93 are so dimensioned that their width is made somewhat smaller than that of respective slits 95 of the guide plate 94. The proximity sensors 92 and 93 are provided as an oblique array relative to the direction in which the slits 95 extend. The first sensor 92 is located in both the positive X and the negative Y directions, and the second sensor 93 in both the negative X and positive Y directions.

The proximity sensors 92 and 93 are situated below the guide plate 94, that is, in the negative Z direction. When the forceps 49 is moved in the positive Y direction from a proper front-facing position into one of clearances among the fuel elements, the proximity sensors 92 and 93 follow the motion of the forceps 49 and are moved along the slit 95a in the positive Y direction.

The proximity sensors 92 and 93 are rendered ON and OFF in accordance with a distance to the guide plate 94, that is, are rendered ON when they are moved nearer the nearest area of the guide plate 94 within a distance below a predetermined value.

As a material for the guide plate 94, use may be made of one which provides a dock for the proximity sensors 92 and 93. In practice, for example, SUS 303 is employed as a material for the guide plate 94.

In FIG. 13, reference numeral 96 shows a stroke end a limit sensor, serving as limit sensor, which is provided integral with the second movable body 69. The limit sensor 96 is provided on the rear end portion of the second movable body 69 under the assumption that the aforementioned rear end portion is determined with the Y direction as the forward/back direction.

The stroke and limit sensor 96 is turned ON and OFF in accordance with, for example, a distance relative to the first movable body 68 situated on the rear side of the second movable body 69. The limit sensor 96 is turned ON when the second movable body 69 is retracted, in the Y direction, back toward the first movable body 68 to allow the limit sensor 96 to be moved to the first movable body 68 within a distance corresponding to a predetermined value.

The output signal of the limit sensor 96 is delivered to the controller 72.

In FIG. 13, reference numeral 97 shows a position detection section which comprises a proximity sensor 98, serving as a movable body, of a cylindrical configuration provided integral with the first movable body 68 and a plate-like fixing section 99 secured to a casing 45 and disposed near the first movable body 68.

The position detection section 97 has a plurality of nearly circular detection holes 100, . . . at the fixing section 99 which are arranged at a substantially equal pitch in the X direction in a linear array. The position detection section 97 is so dimensioned that the diameter of the detection hole 100 is substantially equal, or corresponds to the clearance 203 of the fuel elements 202, . . .

The position detection section 97 is such that the proximity sensor 98 and detection holes 100, . . . are situated at a substantially equal height in the Z direction. Upon the movement of the proximity sensor 98 nearer to the fixing section 99, the position detection section 97 detects whether the proximity sensor 98 is correctly oriented relative to any one of the detection holes 100 or displaced therefrom. The result of detection is sent as an output to, for example, the controller 72.

The operation of the foreign matter recovering apparatus 101 including the stroke end limit sensor 96, movement restriction section 91, position detection section, etc., will be explained below, as shown in FIG. 14.

When the first proximity sensor 92 is moved toward a portion of the guide plate 94 to render it ON, the controller 72 sends to the first feed motor 65 an instruction not to rotate it in a positive direction even if the forceps 49 is operated by the remote control section 44 to move it in the positive X direction.

When, with the first proximity sensor 92 ON, the forceps 49 is operated by the remote control section 44 so as to move it in the negative X direction, the first feed motor 65 is rotated in a reverse direction in accordance with that operation and the forceps 49 is moved in the negative X direction.

With the second proximity sensor 93 ON, on the other hand, the first feed motor 65 is not rotated in the reverse direction and is rotated in a positive direction only. The forceps 49 is moved in the positive X direction only, not in the negative direction.

With either one of the proximity sensors 92 and 93 ON, the controller 72 sends an instruction to the second feed motor 66 so as not to move the forceps 49 in the positive Y direction.

When the second movable body 69 is retracted back in the negative Y direction to allow the forceps 49 to be withdrawn off the clearance 203 between the fuel elements 202, . . . and hence apart from the fuel assembly 201, then the proximity sensors 92 and 93 are also retracted away from the guide plate 94 in the Y direction and the stroke end limit sensor 96 is moved toward the first movable body 68 and, when the aforementioned predetermined distance between the limit sensor 96 and the first movable body 68 reaches a predetermined value, the stroke end limit sensor 96 is turned ON.

In this case, the controller 72 imparts no restriction to the first feed motor 65 and the forceps 49, proximity sensors 92, 93, etc., are freely moved in the X direction in accordance with the operation of the remote control section 44.

It may be possible to initially determine the stroke end of the forceps 49 in the positive Y direction so that it may not be penetrated too deeply. In practical use, for example, the closed end of the slits 95 are detected at their position through the use of the proximity sensors 92 and 93, and the forceps 49 is stopped from being further moved in accordance with the result of detection.

It is thus possible to prevent any error of operation done while viewing the forceps 49 on the monitor 73, and to obtain high reliability.

In the case where the forceps 49, etc., are placed in a state freely movable in the X direction, the position detection section 97 is employed to detect the forceps 49 for a proper position.

That is, the second movable body 69 is retracted back to allow the proximity sensor 98 of the position detection section 97 to be moved nearer the fixing section 99. When the proximity sensor 98 faces the detection hole 100 on the front-facing side, the result of detection by the position detection section 97 is informed to the operator.

As a way of informing the result of detection by the position detection section 97 to the operator, an LED may be provided on the operation panel 71 so that light is emitted upon the alignment of the proximity sensor 98 with the detection hole 100.

After the forceps 49 is properly positioned with the proximity sensor 98 aligned with the detection hole 100, it is advanced toward the fuel assembly 201 and then into a predetermined clearance 203a of a fuel element array as shown in FIG. 12.

Even after the advance of the forceps 49 into that clearance 203a, the movement of the forceps 49 is restricted by the interlocking mechanism 91 and the forceps 49 is moved through the clearance 203a without being brought into contact with the fuel elements 202, ....

This embodiment can obtain the same advantage as that of the fifth embodiment and more exactly control the movement of the forceps 49.

Since the interlocking mechanism section 91 is comprised of the proximity sensors 92, 93 and guide plate 94, the proximity sensors make no contact with the guide plate 94. Therefore, the guide plate 94 is set smaller in rigidity than that in the fifth embodiment, permitting the use of a thinner plate as the guide plate 94.

FIGS. 16 and 17 schematically show a major area on a seventh embodiment of the present invention. In these Figures, the same reference numerals are employed to designate parts or elements corresponding to those shown in the preceding embodiment. Any further explanation of them is, therefore, omitted.

In FIGS. 16 and 17, reference numeral 111 denotes a fiberscope oscillation mechanism hereinafter referred to simply as an oscillation mechanism. The oscillation mechanism 111 includes, as shown in FIG. 17, an oscillation mechanism body 112 and a rotation support 113 integrally projecting on the oscillation mechanism body 112. On the oscillation mechanism body 112 is mounted a drive shaft 115 having an externally threaded section 114 provided on its outer peripheral portion. A rotational force is transmitted to the drive shaft 115 from a drive source, not shown.

A rotational force is transmitted to the drive shaft 115 through a flexible shaft.

In FIG. 16, reference numeral 116 shows a swing plate, and 117, a fiberscope retaining section coupled integral with the swing plate 116. A ball 118 is mounted on one end of the swing plate 116 in a manner to be sandwiched between two flanges 119 and 119 mounted on the drive shaft 115 in a substantially parallel fashion. A spring 120 is anchored to the other end portion of the swing plate 116 which is coupled to the oscillation mechanism body 112 through the spring 120.

The fiberscope retaining section 117 is coupled to a distal end 60 of a fiberscope 59 to retain the fiberscope's distal end. The retaining section 117 engages the rotation support 113 and is pivotally supported by the rotation support 113. The fiberscope retaining section 117, together with the ball 118 and spring 120, is arranged substantially along the axial direction of the swing plate 116 at a location between the ball 118 and the spring 120.

The mounting relation among the oscillation mechanism body 112, swing plate 116 and fiberscope retaining section 117 is so adjusted that the swing plate 116 can be swung in a direction of an arrow B in FIG. 16 with the ball 118 inserted between the flanges 119 and 119 and that this is done without the fiberscope retaining section 11 being detached from the rotation support 113.

With a rotational force applied to the drive shaft 115, the shaft 115 is rotated, moving back and forth in its axial direction in accordance with the direction in which it is rotated. The flanges 119 and 119, together with the drive shaft 115, are displaced as one unit and the ball 118 of the drive shaft 115 is pushed by the flanges 119 and 119. The ball 118 is rolled in accordance with an amount of displacement of the flanges 119, 119 in a manner to be sandwiched between the flanges 119 and 119. The swing plate 116 is swingable in a direction of an arrow B in FIG. 16 with the ball 118 as a center while compressing or stretching the spring 120.

Upon the swinging of the swing plate 116, the fiberscope retaining section 117 is displaced as one unit with the swing plate 116 while retaining an engaging relation to the rotation support 113. The fiber retaining section 117 is inclined with the pivotal point of the rotation shaft 113 as a center to allow the distal end 60 of the fiberscope 59 to be axially rotated in accordance with the direction and displacement amount in and to which the swing plate 116 is swung.

The spring 120 urges the swing plate 116 and distal end 60 of the fiberscope 59 so that their neutral attitudes may be taken.

That is, the oscillation mechanism 111 imparts to the fiberscope 59 the degree of freedom of its rotation direction ($\theta$ direction). As shown in FIG. 17, the distal end 60 of the fiberscope 59 is rotated around its axis and the direction of the fiberscope 59 is changed in a direction intersecting with the axial direction (and entry direction) of the distal end 60.

The oscillation mechanism 111 swings the fiberscope 59 with its axis as a center to oscillate the fiberscope 59. In this case, an imaging and an illuminating array, etc., constituting the distal end 60 of the fiberscope 59 are oscillated as one unit.

The fiberscope 59 has its direction changed, as required, allowing an enlarged viewing field and observation area to be imparted thereto.

In the case where the fiberscope 59 is so fixed that it cannot be rotated around its axis, a field of vision, C, of the fiberscope 59 is restricted by its predetermined range as well as by the range within which the distal end 60 can be moved in the clearances 203, among the fuel elements 202, . . .

Figure 18:
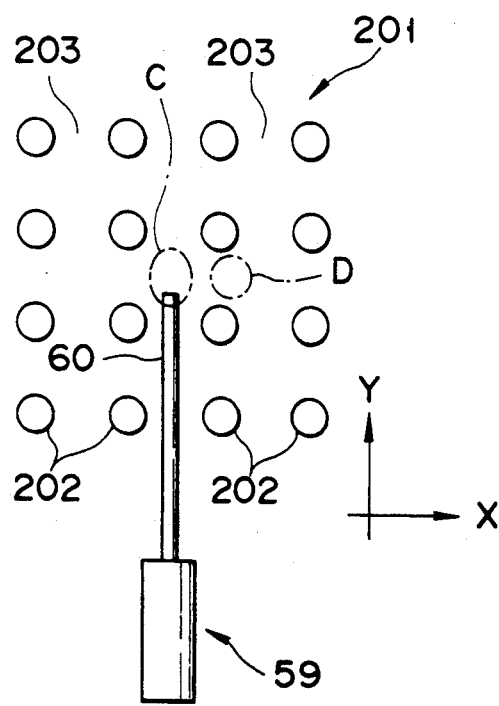
FIG. 18 is a view showing a visual field of the fiberscope when it is fixed in its rotation direction.
Figure 19:
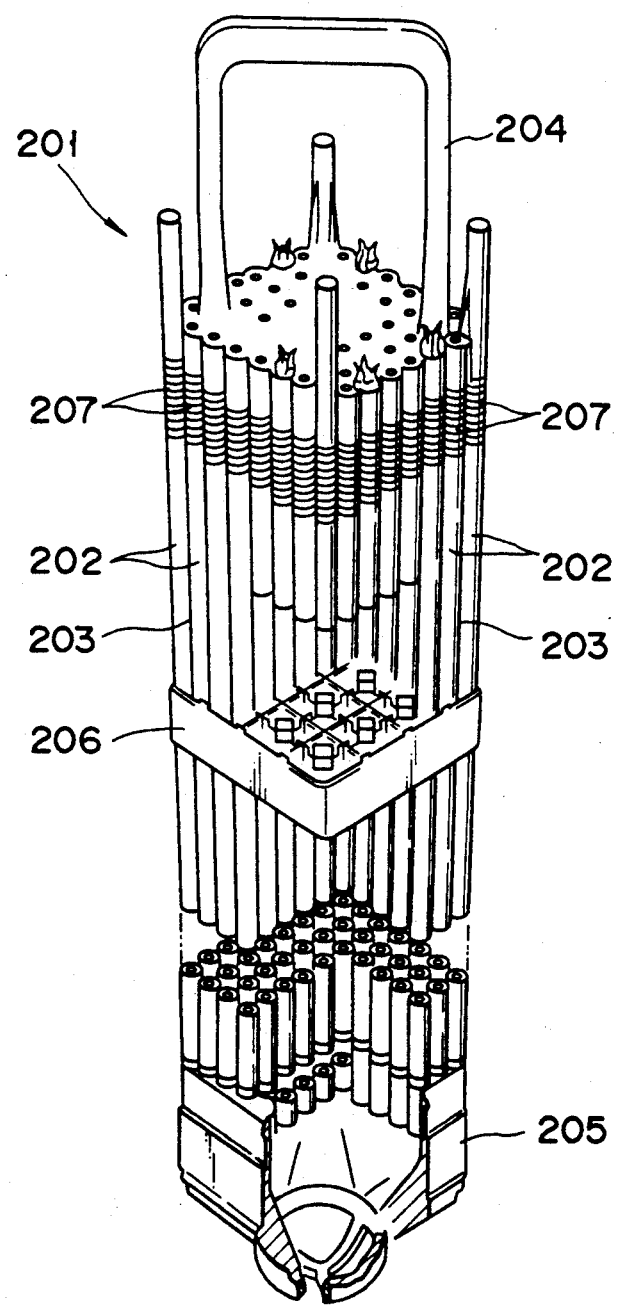
FIG. 19 is a perspective view, partly taken away, showing an ordinary fuel assembly.
Figure 20:
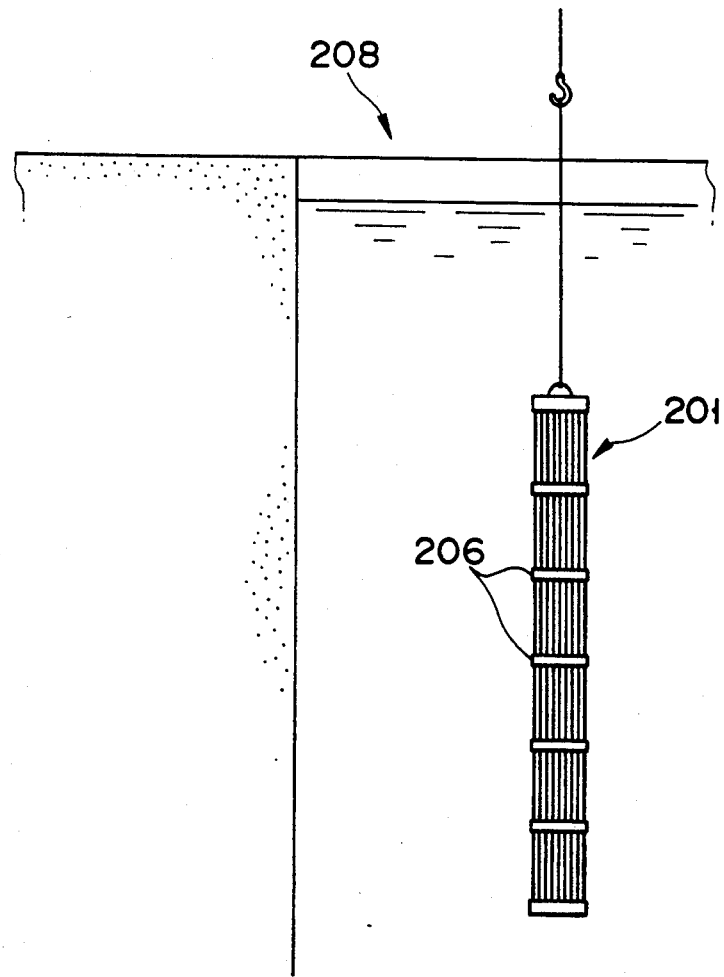
FIG. 20 is a view showing a state in which a fuel assembly is reserved beneath the surface of a fuel storage pool.

In the case where in the clearances of the fuel assembly 201 a site D is observed from a position spaced apart from, for example, a viewing field C in the X direction, (see FIG. 18), it is necessary to separate the aforementioned working unit recovering apparatus (3, 43) away from the fuel assembly 201, to move the distal end 60 of the fiberscope 59 in the Y direction and to once remove the distal end 60 from the fuel assembly 201.

The working unit (3, 43) is moved with its direction changed so that it approaches the fuel assembly 201 from the X direction. The distal end 60 of the fiberscope 59 enters the fuel assembly 201 in the X direction and covers the site D within its visual field.

Since the oscillation mechanism 111 as set out above is provided on the aforementioned embodiment, the field of view of the fiberscope 59 can be readily enlarged and an observation area covered by the fiberscope 59 without moving the working unit (3, 43, etc.,) is enlarged in the X direction to an area E as shown in FIG. 17.

In the present embodiment, the way of obtaining a broader area of observation from a method of approach in two-way direction can be replaced by an approach in a single direction, shortening a working period of time required.

The use of a plurality of fiber cables enables a plurality of clearances 203, ... provided, for example, as a parallel array, in the same direction to be observed.

Mounting the aforementioned oscillation mechanism 111 on the fourth to sixth embodiments (41, 81, 101) enables the fiberscope 59 to be moved in the X, Y, Z and $\theta$ directions.

If a positional relation between the fiberscope 59 and the fiberscope retaining section 117 is adjusted, the fiberscope 59 can be rotated not only around its axis but also in an eccentric way.

The present invention is not restricted to the aforementioned respective embodiments and may be changed or modified in various ways without departing from the spirit and scope of the present invention.

What is claimed is:

1. A foreign matter recovering apparatus comprising: a body for approaching a fuel assembly, the fuel assembly having clearances among fuel elements; a body fixing section for fixing the body to the fuel assembly for positioning; a recovering working unit for recovering foreign matter; a fiberscope for photographing a working state of the recovering working unit and sending a corresponding image to a remote location; a moving mechanism section for moving the recovering working unit and the fiberscope in one direction and in a direction toward or away from the fuel assembly, allowing the recovering working unit and the fiberscope to be operated in cooperation with each other, the recovering working unit adapted to be guided into the clearances of the fuel assembly, the fiberscope following the recovering working unit; and a remote control section for remotely controlling the operations of the moving mechanism and the recovering working unit on the basis of the image to recover the foreign matter.

2. A foreign matter recovering apparatus comprising: a body for approaching a fuel assembly; a body fixing section for fixing the body to the fuel assembly for positioning; a moving mechanism section movable both in one direction and in a direction toward or away from the fuel assembly; a recovering working unit adapted to be moved by the moving mechanism section to gain access to clearances among fuel elements of the fuel assembly to allow foreign matter to be recovered thereby, wherein said recovering working unit is comprised of a needle-like probe; a fiberscope for following the movement of the recovering working unit, while covering the recovering working unit and foreign matter within a viewing field, to photograph a working state of the recovering working unit and to send a corresponding image to a remote location; and a remote control section for remotely controlling the operations of the moving mechanism and recovering working unit on the basis of the image to recover the foreign matter.

3. A foreign matter recovering apparatus comprising: a body for approaching a fuel assembly, wherein said body is equipped with a water stream generation section for imparting a propulsion force to the body; a body fixing section for fixing the body to the fuel assembly for positioning; a moving mechanism section movable both in one direction and in a direction toward or away from the fuel assembly; a recovering working unit adapted to be moved by the moving mechanism section to gain access to clearances among fuel elements of the fuel assembly to allow foreign matter to be recovered thereby; a fiberscope for following the movement of the recovering working unit, while covering the recovering working unit and foreign matter within a viewing field, to photograph a working state of the recovering working unit and to send a corresponding image to a remote location; and a remote control section for remotely controlling the operations of the moving mechanism and recovering working unit on the basis of the image to recover the foreign matter.

4. The foreign matter recovering apparatus according to claim 3, wherein said water stream generation section is comprised of a screw propeller and a rudder is provided for adjusting the attitude of said body.

5. A foreign matter recovering apparatus comprising: a body for approaching a fuel assembly; a body fixing section for fixing the body to the fuel assembly for positioning; a moving mechanism section movable both in one direction and in a direction toward or away from the fuel assembly; a recovering working unit adapted to be moved by the moving mechanism section to gain access to clearances among fuel elements of the fuel assembly to allow foreign matter to be recovered thereby, wherein said recovering working unit includes a suction nozzle for sucking the foreign matter and a recovery case for recovering the sucked foreign matter; a fiberscope for following the movement of the recovering working unit, while covering the recovering working unit and foreign matter within a viewing field, to photograph a working state of the recovering working unit and to send a corresponding image to a remote location; and a remote control section for remotely controlling the operations of the moving mechanism and recovering working unit on the basis of the image to recover the foreign matter.

6. A foreign matter recovering apparatus comprising: a body for approaching a fuel assembly; a body fixing section for fixing the body to the fuel assembly for positioning; a moving mechanism section movable both in one direction and in a direction toward or away from the fuel assembly; a recovering working unit adapted to be moved by the moving mechanism section to gain access to clearances among fuel elements of the fuel assembly to allow foreign matter to be recovered thereby; a fiberscope for following the movement of the recovering working unit, while covering the recovering working unit and foreign matter within a viewing field, to photograph a working state of the recovering working unit and to send a corresponding image to a remote location; and a remote control section for remotely controlling the operations of the moving mechanism and recovering working unit on the basis of the image to recover the foreign matter, wherein said remote control section includes an operation panel having a plurality of joysticks and a display unit for displaying the state of working by the working unit.

7. A foreign matter recovering apparatus comprising: a body for approaching a fuel assembly; a body fixing section for fixing the body to the fuel assembly for positioning; a recovering working unit for gaining access to clearances among fuel elements of the fuel assembly and recovering the foreign matter; a fiberscope for recovering the recovering working unit and foreign matter and photographing a state of working by the recovering working; a positioning mechanism section for moving the recovering working unit and fiberscope, as one unit, in a plurality of directions for positioning; a display unit for displaying an image, photographed by the fiberscope, at a remote location; a remote control section for performing a remote control on the basis of the image displayed on the display unit; and a control section for controlling the positioning mechanism section and recovering working unit on the basis of an output of the remote control section.

8. The foreign matter recovering apparatus according to claim 7, wherein said body fixing section is comprised of a guide for guiding the fuel assembly and clamps for holding the fuel assembly therebetween.

9. The foreign matter recovering apparatus according to claim 7, wherein said recovering working unit is comprised of forceps.

10. The foreign matter recovering apparatus according to claim 7, wherein said body includes a water stream generation section for imparting a propulsion force to the body.

11. The foreign matter recovering apparatus according to claim 1 or 7, further comprising a fiberscope oscillation mechanism for swinging the fiberscope and adjusting the direction of its optical end face.

12. A foreign matter recovering apparatus comprising: a body for approaching a fuel assembly; a body fixing section for fixing the body to the fuel assembly for positioning; a working unit for gaining access to clearances among fuel elements of the fuel assembly and recovering a foreign matter there; a fiberscope for covering the recovering working unit and foreign matter and photographing a state of working by the recovering working unit; positioning mechanism section for moving the working unit and fiberscope, as one unit, in a plurality of directions for positioning; a display unit for displaying an image, photographed by the fiberscope, at a remote location; a remote control section for performing a remote control operation on the basis of an image displayed on the display unit; a control unit for controlling the positioning mechanism and recovering working unit on the basis of an output of the remote control section; and a movement restriction section for preventing the recovering working unit from being moved toward the fuel assembly when it is incorrectly displaced relative to very small clearances of the fuel assembly and allowing the recovering working unit to be moved toward the fuel assembly when the recovering working unit is correctly oriented toward the clearance of the fuel assembly to allow it to gain access to the small clearance of the fuel assembly.

13. The foreign matter recovering apparatus according to claim 12, wherein said movement restriction section comprises an engaging projection adapted to, together with the working unit, be displaced as one unit in accordance with a movement of the recovering working unit in a predetermined direction; and a guide member provided integral with the body and having a guide recess which is so set as to have a positional relation to the clearances of the fuel assembly, said guide member being engaged by the engaging projection when the recovering working unit is moved toward the fuel assembly while being incorrectly displaced relative to the very small clearances of the fuel assembly, and being retracted back into the guide recess, upon the movement of the recovering working unit in a direction to correctly align with the small clearance of the fuel assembly, to enable the engaging projection to be moved along the guide recess.

14. The foreign matter recovering apparatus according to claim 12, wherein said movement restriction section is comprised of a guide member provided with the body and having a guide recess provided in a positional relation corresponding to the very small clearances of the fuel assembly and a plurality of proximity sensors which, together with the recovering working unit, are displaced as one unit in accordance with the movement of the working unit in a predetermined direction to detect the position of the guide recess; a position detection section is provided for detecting the position of the recovering working unit when the recovering working unit is spaced apart from the fuel assembly with the working unit placed outside the clearances of the fuel assembly; and said control unit controls the positioning mechanism section and recovering working unit in accordance with the outputs of the remote control section, proximity sensors and position detection section.

15. The foreign-matter recovering apparatus according to claim 14, wherein said position detection section includes a fixing section representing the position of the fuel assembly and a movable body for detecting the position of the clearances of the fuel assembly in a manner to follow the movement of the recovering working unit.

16. The foreign matter recovering apparatus according to claim 14, further comprising a limit sensor for restricting a spacing between the recovering working unit and the fuel assembly when the working unit is retracted back from the fuel assembly.

* * * * *